(12) United States Patent
Ben-Itzhak et al.

(10) Patent No.: US 11,928,857 B2
(45) Date of Patent: Mar. 12, 2024

(54) UNSUPERVISED ANOMALY DETECTION BY SELF-PREDICTION (71) Applicant: VMware, Inc., Palo Alto, CA (US)

(72) Inventors: Yaniv Ben-Itzhak, Afek (IL); Shay Vargaftik, Nazareth-Illit (IL)

(73) Assignee: VMware LLC, Palo Alto, CA (US)

( * ) Notice: Subject to any disclaimer, the term of this patent is extended or adjusted under 35 U.S.C. 154(b) by 838 days.

(21) Appl. No.: 16/924,048

(22) Filed: Jul. 8, 2020

(65) Prior Publication Data
US 2022/0012626 A1 Jan. 13, 2022

(51) Int. Cl.
G06V 10/774 (2022.01)
G06F 18/214 (2023.01)
G06F 18/22 (2023.01)
G06N 20/00 (2019.01)
G06V 10/77 (2022.01)
G06V 10/778 (2022.01)

(52) U.S. Cl.
CPC ........ *G06V 10/7753* (2022.01); *G06F 18/214* (2023.01); *G06F 18/22* (2023.01); *G06N 20/00* (2019.01); *G06V 10/77* (2022.01); *G06V 10/778* (2022.01)

(58) Field of Classification Search
CPC .. G06V 10/7753; G06V 10/778; G06V 10/77; G06N 20/00; G06F 18/22; G06F 18/214
See application file for complete search history.

(56) References Cited

U.S. PATENT DOCUMENTS

| 2014/0279754 | A1* | 9/2014 | Barsoum | G06N 7/01 706/12 |
| 2019/0130279 | A1* | 5/2019 | Beggel | G06N 5/045 |
| 2022/0179406 | A1* | 6/2022 | Zope | G05B 23/0221 |

OTHER PUBLICATIONS

Alireza Makhzani, et al., "Adversarial autoencoders", arXiv preprint arXiv:1511.05644, 16 pages (2015).
Mayu Sakurada, et al., "Anomaly Detection Using Autoencoders with Nonlinear Dimensionality Reduction". Proceedings of the MLSDA 2014 2nd Workshop on Machine Learning for Sensory Data Analysis, 8 pages ( 2014).

(Continued)

*Primary Examiner* — Eric Nilsson
(74) *Attorney, Agent, or Firm* — Quarles & Brady LLP (57) ABSTRACT Techniques for implementing unsupervised anomaly detection by self-prediction are provided. In one set of embodiments, a computer system can receive an unlabeled training data set comprising a plurality of unlabeled data instances, where each unlabeled data instance includes values for a plurality of features. The computer system can further train, for each feature in the plurality of features, a supervised machine learning (ML) model using a labeled training data set derived from the unlabeled training data set, receive a query data instance, and generate a self-prediction vector using at least a portion of the trained supervised ML models and the query data instance, where the self-prediction vector indicates what the query data instance should look like if it were normal. The computer system can then generate an anomaly score for the query data instance based on the self-prediction vector and the query data instance.

21 Claims, 3 Drawing Sheets (56) References Cited

OTHER PUBLICATIONS

Jinwon An, et al., "Variational Autoencoder Based Anomaly Detection Using Reconstruction Probability", Special Lecture on IE 2.1, 18 pages (2015).
Andrea Borghesi, et al., "Anomaly Detection Using Autoencoders in High Performance Computing Systems". Proceedings of the AAAI Conference on Artificial Intelligence, 7 pages, vol. 33. (2019.).
J. G. Dy and C. E. Brodley, "Feature Selection for Unsupervised Learning," Journal of Machine Learning Research, vol. 5, pp. 845-889, Aug. 2004.
Related U.S. Appl. No. 17/115,432, filed Dec. 8, 2020 (unpublished).

* cited by examiner

UNSUPERVISED ANOMALY DETECTION BY SELF-PREDICTION

BACKGROUND

In machine learning (ML), classification is the task of predicting, from among a plurality of predefined categories (i.e., classes), the class to which a given data instance belongs. A machine learning model that implements classification is referred to as an ML classifier. Examples of well-known types of supervised ML classifiers include random forest (RF), adaptive boosting, and gradient boosting, and example of a well-known type of unsupervised ML classifier is isolation forest (IF).

Anomaly detection is a particular use case of classification that comprises predicting whether a data instance belongs to a "normal" class or an "anomaly" class, under the assumption that most data instances are normal rather than anomalous. Anomaly detection is commonly employed in various applications/fields such as network monitoring, finance, medical diagnostics, and more. An ML classifier that is configured to perform anomaly detection is referred to as an anomaly detection classifier.

Anomaly detection and classification in general can be supervised, unsupervised, or semi-supervised (which combines aspects of the supervised and unsupervised approaches). Supervised anomaly detection involves learning how to predict anomalies via a labeled set of training data—in other words, a training data set in which each data instance includes a label indicating the correct class (normal or anomaly) of that data instance. In contrast, unsupervised anomaly detection involves learning how to predict anomalies via an unlabeled set of training data—in other words, a training data set in which each data instance includes only the features/attributes of that data instance, without a corresponding class label.

Generally speaking, supervised anomaly detection has the potential to achieve higher prediction quality (in terms of accuracy, precision, and recall) than unsupervised anomaly detection due to the labeled data set it uses for training. However, for many anomaly detection scenarios, anomalies cannot be identified in advance, or the process of labeling data instances for training is extremely expensive and/or time consuming. Thus, unsupervised (rather that supervised) anomaly detection is used in these scenarios due to a lack of labeled training data.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for implementing unsupervised anomaly detection via a mechanism referred to as "self-prediction." In one set of embodiments, these techniques can include receiving an unsupervised training data set X and training a set of supervised ML models using labeled training data sets that are derived from X Each supervised ML model can be trained to predict the value of a particular feature (i.e., column) in unlabeled training data set X, based on the values of other features in X.

Then, at the time of receiving a query data instance x to be classified as either normal or anomalous, an appropriate portion of x can be provided as input to each trained supervised ML model for classification/inference. The outputs of these models collectively form a "self-prediction vector" that indicates what the feature values of query data instance x should be, per the data characteristics of unlabeled training data set X, if x were normal. Finally, the self-prediction vector can be compared with query data instance x to generate an anomaly score indicating the likelihood that x is anomalous.

With this general approach, anomaly detection can be carried out in an unsupervised manner (i.e., without access to labeled training data), but at a level of quality that is potentially higher than conventional unsupervised methods. The foregoing and other aspects of the present disclosure are described in further detail below.

2. High-Level Solution Description

Figure 1:
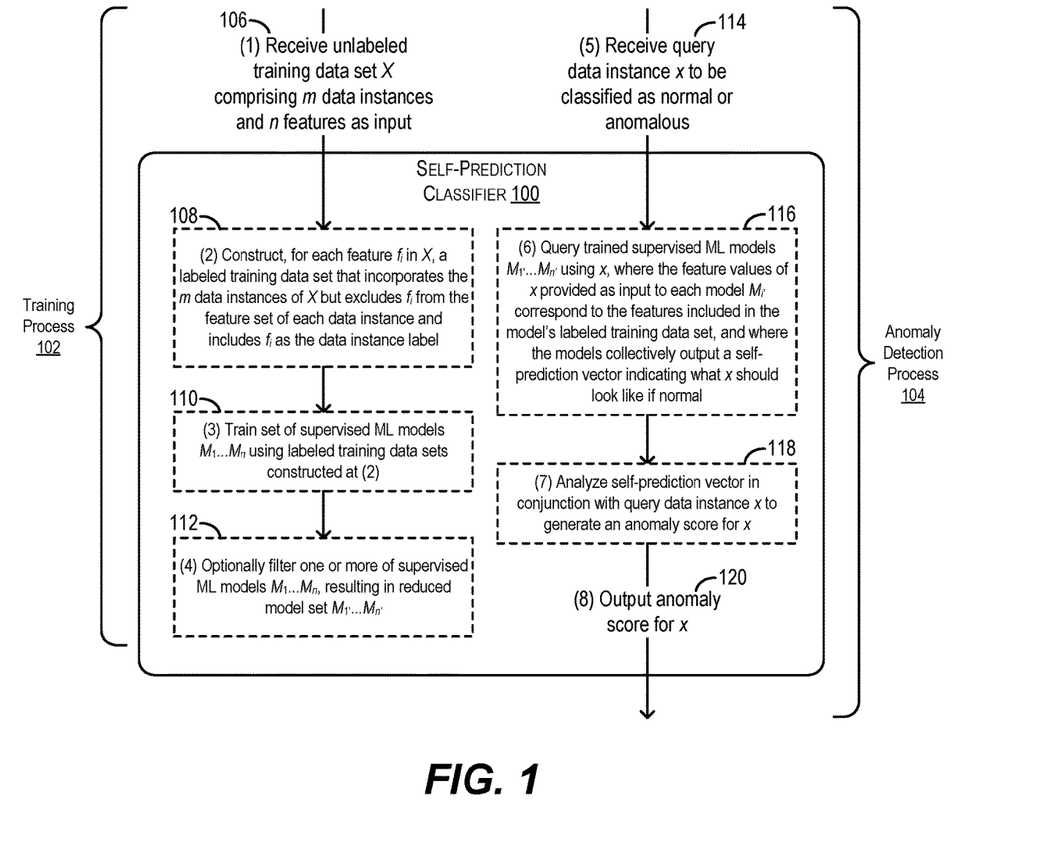
FIG. 1 depicts a process for implementing unsupervised anomaly detection by self-prediction according to certain embodiments.

FIG. 1 depicts an unsupervised anomaly detection classifier 100 (referred to herein as a "self-prediction classifier") that implements the techniques of the present disclosure, along with processes 102 and 104 for training classifier 100 and performing anomaly detection using classifier 100 according to certain embodiments.

Starting with training process 102, at step (1) (reference numeral 106), self-prediction classifier 100 can receive an unlabeled training data set X that comprises m data instances and n features $f_1 \ldots f_n$. Each data instance can be understood as a row of unlabeled training data set X and each feature can be understood as a column (or dimension) of X, such that each data instance includes n feature values corresponding to $f_1 \ldots f_n$ respectively. By way of example, Table 1 below illustrates a version of unlabeled training data set X in the scenario where X comprises three features (columns) "age," "eye color," and "hair color" and four data instances (rows) with values for these features:

TABLE 1

Example Unlabeled Training Data Set X

| Age | Hair Color | Eye Color |
|---|---|---|
| 25 | Black | Brown |
| 40 | Blonde | Blue |
| 16 | Brown | Brown |
| 52 | Red | Green |

At step (2) (reference numeral 108), self-prediction classifier 100 can construct, for each feature $f_i$ of unlabeled training data set X, a labeled training data set $(X_i, y_i)$ that incorporates the m data instances of X, but (1) excludes feature $f_i$ from the feature set of each data instance and (2) adds $f_i$ as the label for each data instance (i.e., $y_i$). Stated in a more formal manner, each labeled training data set can be defined as follows:

$$(X_i, y_i) = \begin{cases} X_i = X \setminus X[i] \\ y_i = X[i] \end{cases} \text{for } i \in [1\ldots n] \quad \text{Listing 1}$$

In this formulation, X[i] is the i'th feature of unlabeled training data set X, $X_i$ is the matrix of features in labeled training data set $(X_i, y_i)$, and $y_i$ is the vector of labels in labeled training data set $(X_i, y_i)$. In addition, the expression "a\b" indicates that b is excluded from a (and thus "X\X[i]" signifies the exclusion of feature i from X).

Assuming the foregoing formulation is applied to the version of unlabeled training data set X in Table 1, the following are the labeled training data sets that would be created for the features "age," "hair color," and "eye color" respectively:

TABLE 2

Labeled Training Data Set for "Age"

| Hair Color | Eye Color | Label |
|---|---|---|
| Black | Brown | 25 |
| Blonde | Blue | 40 |
| Brown | Brown | 16 |
| Red | Green | 52 |

TABLE 3

Labeled Training Data Set for "Hair Color"

| Age | Eye Color | Label |
|---|---|---|
| 25 | Brown | Black |
| 40 | Blue | Blonde |
| 16 | Brown | Brown |
| 52 | Green | Red |

TABLE 4

Labeled Training Data Set for "Eye Color"

| Age | Hair Color | Label |
|---|---|---|
| 25 | Black | Brown |
| 40 | Blonde | Blue |
| 16 | Brown | Brown |
| 52 | Red | Green |

Upon constructing the labeled training data sets from unlabeled training data set X at step (2), self-prediction classifier 100 can train a corresponding set of supervised ML models $M_1 \ldots M_n$ using the labeled training data sets (step (3); reference numeral 110). Through this training, each supervised ML model $M_i$ can be trained to predict the value of feature $f_i$ from X, based on the values of the other features in X For example, with respect to unlabeled training data set X of Table 1, self-prediction classifier 100 can train a first supervised ML model $M_1$ using the labeled training data set shown in Table 2 (thereby training $M_1$ to predict "age" based on values for "hair color" and "eye color"), a second supervised ML model $M_2$ using the labeled training data set shown in Table 3 (thereby training $M_2$ to predict "hair color" based on values for "age" and "eye color"), and a third supervised ML model $M_3$ using the labeled training data set shown in Table 4 (thereby training $M_3$ to predict "eye color" based on values for "age" and "hair color"). Because "age" is a numerical feature, supervised ML model $M_1$ will be a regressor (i.e., an ML model configured to predict/output a numerical value). In contrast, because "hair color" and "eye color" are categorical features, supervised ML models $M_2$ and $M_3$ will be classifiers (i.e., ML models configured to predict/output categorical, or class, values).

Then at step (4) (reference numeral 112), self-prediction classifier 100 can optionally filter one or more of the trained supervised ML models $M_1 \ldots M_n$, resulting in a reduced model set $M_{1'} \ldots M_{n'}$. In one set of embodiments, the filtering performed at step (4) can be based on a performance score determined for each trained supervised ML model $M_i$ which indicates the prediction accuracy/performance of $M_i$ (e.g., out-of-bag score, etc.). In these embodiments, the models whose performance score falls below a predefined low threshold can be removed/filtered. In other embodiments, other types of filtering criteria can be used. In the case where the filtering of step (4) is omitted, each model $M_{i'}$ in "reduced" model set $M_{1'} \ldots M_{n'}$ can be assumed to be equivalent to model $M_i$ in trained model set $M_1 \ldots M_n$.

Turning now to anomaly detection process 104, at step (5) (reference numeral 114), self-prediction classifier 100 can receive a query data instance x to be classified as normal or anomalous. In response, self-prediction classifier 100 can query trained supervised ML models $M_{1'} \ldots M_{n'}$ using x, where the specific feature values of x provided as input to each model $M_{i'}$ correspond to the features included in the labeled training data set used to train $M_{i'}$ (step (6); (reference numeral 116).

For example, assume query data instance x includes the following values for "age," "hair color," and "eye color" respectively: <9, blonde, brown>. In this case, self-prediction classifier 100 can provide the feature values <blonde, brown> as input to model $M_1$ noted above (because $M_1$ was trained to predict "age" based on "hair color" and "eye color"), provide the feature values <9, brown> as input to model $M_2$ noted above (because $M_2$ was trained to predict "hair color" based on "age" and "eye color"), and provide the feature values <9, blonde> as input to model $M_3$ noted above (because $M_3$ was trained to predict "eye color" based on "age" and "hair color").

The output generated by each model $M_{i'}$ at step (6) is a predicted value $y_{i'}$ for feature $f_{i'}$ (in other words, the feature excluded from that model's labeled training data set and included as the data set label). Thus, taken together, the outputs of these models can be understood as forming a self-prediction vector of $\overline{y}=(y_{1'} \ldots y_{n'})$ which indicates what the corresponding feature values of query data instance x should be (per the data originating from unlabeled training data set X), if x were normal.

Finally, at steps (7) and (8) (reference numerals 118 and 120), self-prediction classifier 100 can analyze self-prediction vector $\overline{y}$ in conjunction with query data instance x to generate an anomaly score for x (i.e., a score representing the likelihood that x is anomalous) and can output the generated anomaly score. In one set of embodiments, the analysis at step (6) can comprise computing a distance between self-prediction vector $\overline{y}$ and query data instance x, with a larger distance indicating a higher likelihood that x is anomalous (because a large distance signifies that x does not conform to the majority of data instances in original unlabeled training data set X, per the trained supervised ML models).

In another set of embodiments, the analysis at step (6) can comprise providing self-prediction vector $\overline{y}$ and query data instance x as input to a separate, unsupervised anomaly detection classifier (e.g., an IF classifier). The unsupervised anomaly detection classifier can then generate an anomaly score for x based on the combination of these two inputs.

3. Training Workflow

Figure 2:
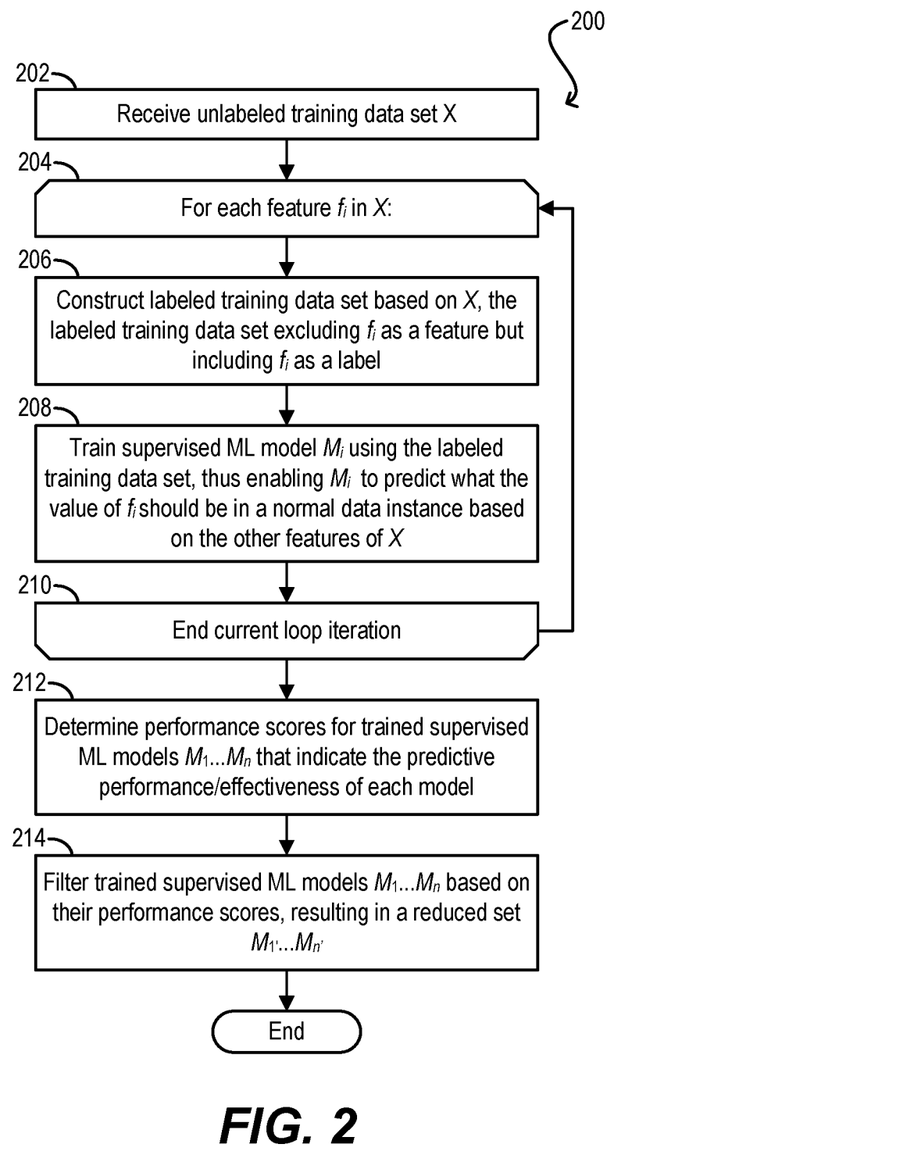
FIG. 2 depicts a training workflow according to certain embodiments.

FIG. 2 depicts a workflow 200 that presents, in flowchart form, the training process attributed to self-prediction classifier 100 in FIG. 1 according to certain embodiments. As used herein, a "workflow" refers to a series of actions or steps that may be taken by one or more entities. Although workflow 200 is depicted as sequential series of steps, in some embodiments certain portions of workflow 200 may be performed in parallel. For example, in a particular embodiment, the training of the supervised ML models described at block 208 can be executed concurrently (i.e., in parallel), either by a single computing device/system across or multiple computing devices/systems.

At block 202. self-prediction classifier 100 can receive an unlabeled training data set X that comprises a plurality of data instances, each data instance including values for a plurality of features (i.e., columns) $f_1, \ldots, f_n$.

At block 204, self-prediction classifier 100 can enter a loop for each feature $f_i$. Within this loop, self-prediction classifier 100 can construct a labeled training data set that incorporates all of the data instances in unlabeled training data set X, but excludes feature $f_i$ from each data instance and instead adds that feature as the label for the data instance (block 206). Self-prediction classifier 100 can then train a supervised ML model $M_i$ using the labeled training data set (block 208), thereby enabling model $M_i$ to predict what the value of feature $f_i$ should be in a normal data instance, based on features $f_1 \ldots f_n \backslash f_i$ (i.e., the other features excluding $f_i$).

As noted previously, in scenarios where feature $f_i$ is categorical, model $M_i$ will be a classifier; conversely, in scenarios where feature $f_i$ is numerical, model $M_i$ will be a regressor. However, self-prediction classifier 100 is not otherwise constrained in terms of the type of ML model that is used to implement $M_i$. For example, if feature $f_i$ is categorical, $M_i$ may be implemented using an RF classifier, an adaptive boosting classifier, a gradient booster classifier, etc. Similarly, if feature $f_i$ is numerical, $M_i$ may be implemented using an RF regressor, an adaptive boosting regressor, and so on. In certain embodiments, self-prediction classifier 100 may employ different types of classifiers/regressors for different features (e.g., an RF classifier for feature $f_1$, an adaptive boosting classifier for feature $f_2$, etc.).

Upon training supervised ML model $M_i$ at block 208, self-prediction classifier 100 can reach the end of the current loop iteration (block 210) and return to the top of the loop to process the next feature. Once all of the features have been processed and corresponding supervised ML models $M_1 \ldots M_n$ have been trained, self-prediction classifier 100 can determine a performance score for each trained model $M_i$ that indicates the predictive performance/effectiveness of $M_i$ (block 212). Generally speaking, the nature of this performance score can vary depending on the type of each model $M_i$; for example, in a scenario where a given model is an RF classifier, the performance score may be an out-of-bag score that indicates the overall effectiveness of the decision trees included in the RF classifier.

Finally, at block 214, self-prediction classifier 100 can optionally filter the trained supervised ML models $M_1 \ldots M_n$ based on their respective performance scores, resulting in a reduced model set $M_{1'} \ldots M_{n'}$ (where n' is less than or equal to n). Workflow 200 can subsequently end.

It should be appreciated that workflow 200 is illustrative and various modifications are possible. For example, although workflow 200 assumes that self-prediction classifier 100 creates and trains n separate supervised ML models (one for each feature $f_1 \ldots f_n$) via the loop starting at block 204, in some embodiments classifier 100 may create and train less than n models by, e.g., selecting a subset of features for model creation/training (using principal component analysis (PCA) or some other feature selection/ranking method) or by combining several features into a single feature (via a sum, sum of squares, or any other function).

Further, although workflow 200 assumes that the labeled training data set constructed for each feature $f_i$ at block 206 includes all of the features of unlabeled training data set X other than $f_i$ (i.e., $f_1 \ldots f_n \backslash f_i$), in some embodiments this may not be the case. Instead, self-prediction classifier 100 may select a subset of those other features for inclusion in the labeled training data set based on one or more criteria (e.g., a correlation measure between those other features and feature $f_i$ etc.).

Yet further, although not shown in workflow 200, in some embodiments self-prediction classifier 100 can compute a weight for each supervised ML model (and thus, for the feature which that model is trained to predict). These per-model/feature weights can be computed based on a feature importance metric that is determined from the model itself or via one or more external tools (e.g., other ML models or algorithms that evaluate unlabeled training data set X), or based on the per-model performance scores that are determined at block 212. The weights can subsequently be used at the time of anomaly detection to influence the degree to which each feature affects the final anomaly score output by self-prediction classifier 100.

4. Anomaly Detection Workflow

Figure 3:
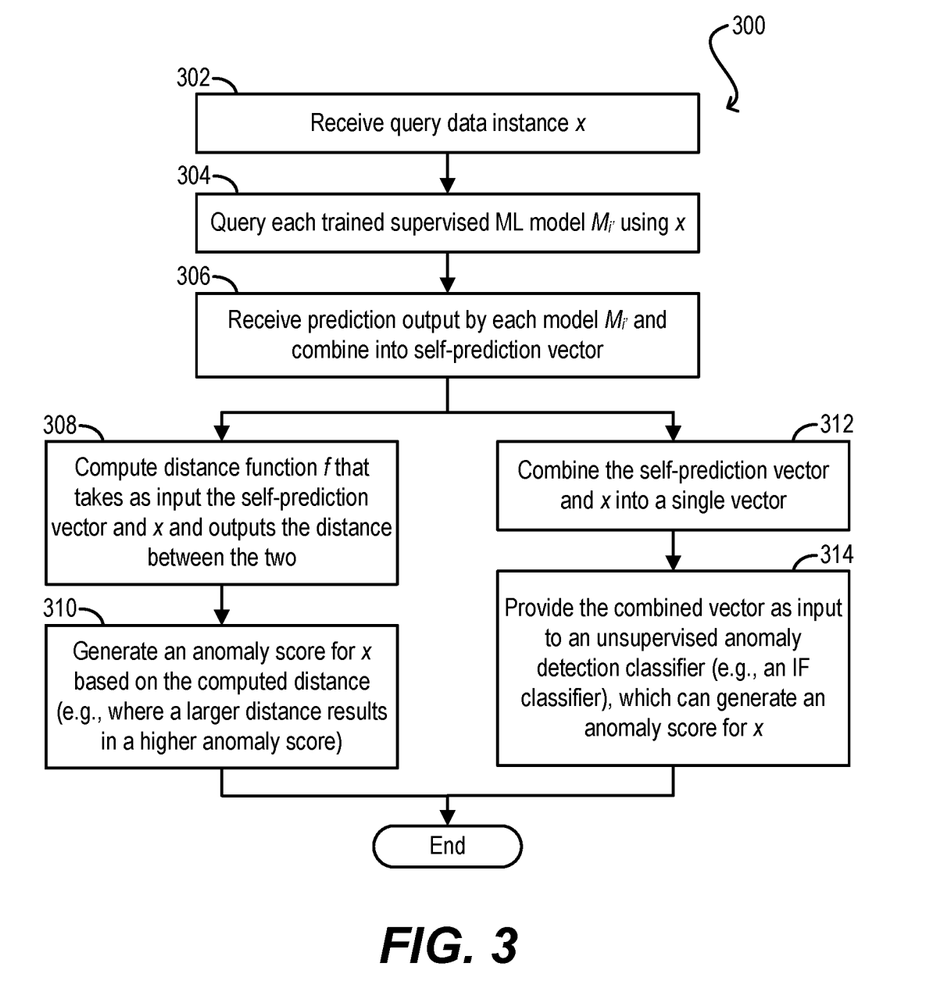
FIG. 3 depicts an anomaly detection workflow according to certain embodiments.

FIG. 3 depicts a workflow 300 that presents, in flowchart form, the anomaly detection process attributed to self-prediction classifier 100 in FIG. 1 according to certain embodiments. Workflow 300 assumes that the training process of workflow 200 has been executed.

Like workflow 200, although workflow 300 is depicted as sequential series of steps, certain portions of workflow 300 may be performed in parallel. For example, in a particular embodiment, the querying of the supervised ML models described at block 304 can be executed concurrently, either by a single computing device/system across or multiple computing devices/systems.

Starting with blocks 302 and 304, self-prediction classifier 100 can receive an unknown (i.e., query) data instance x to be classified as normal or anomalous and can query each trained supervised ML model $M_{i'}$ in model set $M_{1'} \ldots M_{n'}$ using x. In particular, as part of querying each model $M_{i'}$, self-prediction classifier 100 can provide to $M_{i'}$ the feature values of x without the value for feature $f_i$.

At block 306, self-prediction classifier 100 can receive the predicted value output by each model $M_{i'}$ (i.e., value $y_{i'}$) and combine these values into a self-prediction vector $\bar{y}$. Self-prediction classifier 100 can then take one of two approaches for generating an anomaly score for query data instance x based on self-prediction vector $\bar{y}$ and x.

According to a first approach (shown via the left-hand sequence of blocks following block 306), self-prediction classifier 100 can compute a distance function $f$ that takes as input $\bar{y}$ and x and that outputs a distance between these two vectors (block 308). Self-prediction classifier 100 can subsequently generate an anomaly score for x based on this distance, such that a larger distance between $\bar{y}$ and x results in a higher anomaly score and vice versa (block 310). The intuition behind this relationship is that a larger distance indicates a lower degree of similarity between self-prediction vector $\bar{y}$ and query data instance x, which in turn signifies a higher probability that x is anomalous.

A number of different distance functions can used for the computation at block 308. For instance, the following is one example formulation for $f$ based on the L1, L2, . . . , L-infinity Norm distance:

$$f(x,\bar{y}) = \|x - \bar{y}\|_p \text{ for } p = 1, 2, \ldots, \infty \qquad \text{Listing 2}$$

It should be noted that in the case where a given feature/index k of query data instance x is numerical, the distance between x[k] and $y_k$ can be computed by taking the absolute difference between these two values as indicated in Listing 2 above. However, in the case where a given feature/index k of query data instance x is categorical, it is not possible to subtract one category/class from another. Accordingly, in the latter case, the distance between x[k] and $y_k$ can be computed by, e.g., taking the absolute difference between (1) the class probability value generated by corresponding supervised ML model $M_k$ for the class value represented by x[k], and (2) the class probability value generated by $M_{k'}$ for the class value represented by $y_k$. For example, if the value of x[k] is "brown," the value of $y_k$ is "black," and supervised ML model $M_{k'}$ generated class probability values of 0.5 and 0.3 for "brown" and "black" respectively, the distance between these two classes can be computed as the absolute difference between 0.5 and 0.3 (i.e., 0.2).

As another option, self-prediction classifier 100 can calculate a distance between the class distribution vector output by ML model $M_{k'}$ and a "perfect" class distribution vector that is constructed for x[k] (i.e., a class distribution vector in which the probability value for class k is 1 and the probability values for all other classes is 0). For example, if the value of x[k] is "brown" and supervised ML model $M_{k'}$ generated a class distribution vector comprising probability values 0.7 and 0.3 for "brown" and "black" respectively, classifier 100 can calculate the distance (e.g., Euclidean distance) between [1, 0, 0] (which is the perfect class distribution vector for "brown") and [0.7, 0.3].

In addition, it should be noted that in some scenarios, certain features/columns in query data instances x may include numerical values that span significantly different ranges. For example, a first feature may have values ranging from −10 to 10, while a second feature may have values ranging from 0 to 1,000,000. In these scenarios, the features with larger value ranges can have a stronger influence on the distance calculated at block 308, simply due to the size of their ranges.

To avoid this, in certain embodiments self-prediction classifier 100 can ensure that the distance computed for each numerical feature k of x is normalized to a predefined range such as [0 . . . 1]. In one set of embodiments, this can be achieved by normalizing the value of each numerical feature x[k] prior to providing it as input to distance function $f$ at block 308. In other embodiments, this can be achieved by normalizing the output of distance function $f$ itself.

Turning now to the right-hand sequence of blocks following block 306, a second approach for generating the anomaly score for query data instance x is to combine $\bar{y}$ and x into a single vector (block 312) and provide this combined vector as input to a separate, unsupervised anomaly detection classifier (e.g., an IF classifier) (block 314). The unsupervised classifier can then generate an anomaly score for query data instance x based on the feature values of both $\bar{y}$ and x. With this approach, if the unsupervised classifier is unable to process categorical features, self-prediction classifier 100 can translate any categorical features in $\bar{y}$ and x into numerical features prior to providing the combined vector as input to the unsupervised classifier at block 314.

5. Supporting Online Anomaly Detection

In certain embodiments, the unsupervised anomaly detection techniques of the present disclosure can be employed in an online setting (i.e., a setting where anomaly detection is performed on incoming query data instances in a continuous, streaming manner). In these embodiments, the supervised ML models of self-prediction classifier 100 can be updated dynamically based on the content of the incoming query data instances by, e.g., converting each query data instance into labeled training data instances (per the formulation shown in Listing 1) and re-training the supervised ML models using the labeled training data instances.

To mitigate the performance impact of this dynamic re-training process, the supervised ML models may not be updated for every incoming query data instance; instead, the incoming query data instances may be sampled according to some probability distribution and only the sampled data instances may be used for re-training. Alternatively or in addition, for a given query data instance that is sampled, only a particular subset of supervised ML models may be chosen for re-training based on that instance.

Further, in some embodiments, a smaller set of ML models may be deployed in front of the supervised ML models and these smaller models may be used to score incoming query data instances for their training value. The scores generated by the smaller models can then be used to determine whether the query data instances should be sampled for re-training of the supervised ML models.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   receiving, by a computer system, an unlabeled training data set comprising a plurality of unlabeled data instances, each unlabeled data instance including values for a plurality of features;
   for each feature in the plurality of features, training, by the computer system, a supervised machine learning (ML) model using a labeled training data set derived from the unlabeled training data set, wherein the labeled training data set comprises a plurality of labeled data instances, and wherein each labeled data instance includes:
      a label corresponding to a value for the feature in an unlabeled data instance of the unlabeled training data set; and
      values for other features in the unlabeled data instance;
   receiving, by the computer system, a query data instance;
   generating, by the computer system, a self-prediction vector using at least a portion of the trained supervised ML models and the query data instance, the self-prediction vector including values for the plurality of features that the query data instance should have if the query data instance is normal rather than anomalous; and
   generating, by the computer system, an anomaly score for the query data instance based on the self-prediction vector and the query data instance.

2. The method of claim 1 wherein generating the self-prediction vector comprises, for each supervised ML model trained using a labeled training data set whose labels correspond to a feature k in the plurality of features:
   providing, to the supervised ML model, one or more values in the query data instance for one or more features in the plurality of features other than feature k; and
   generating, using the supervised ML model, a predicted value for feature k.

3. The method of claim 1 wherein generating the anomaly score comprises:
   computing a distance between the query data instance and the self-prediction vector.

4. The method of claim 3 wherein computing the distance comprises, for each feature in the plurality of features:
   if the feature is a numerical feature, computing an absolute difference between a first value for the feature in the query data instance and a second value for the feature in the self-prediction vector.

5. The method of claim 3 wherein computing the distance comprises, for each feature in the plurality of features:
   if the feature is a categorical feature, computing an absolute difference between a first class probability value generated with respect to a first value for the feature in the query data instance and a second class probability value generated with respect to a second value for the feature in the self-prediction vector.

6. The method of claim 1 wherein generating the anomaly score comprises:
   providing the query data instance and the self-prediction vector as input to an unsupervised anomaly detection classifier.

7. The method of claim 1 wherein prior to generating the self-prediction vector, the trained supervised ML models are filtered based on their predictive performance, and wherein the self-prediction vector is generated using a subset of the trained supervised ML models that are not filtered.

8. A non-transitory computer readable storage medium having stored thereon program code executable by a computer system, the program code causing the computer system to execute a method comprising:
   receiving an unlabeled training data set comprising a plurality of unlabeled data instances, each unlabeled data instance including values for a plurality of features;
   for each feature in the plurality of features, training a supervised machine learning (ML) model using a labeled training data set derived from the unlabeled training data set, wherein the labeled training data set comprises a plurality of labeled data instances, and wherein each labeled data instance includes:
      a label corresponding to a value for the feature in an unlabeled data instance of the unlabeled training data set; and
      values for other features in the unlabeled data instance;
   receiving a query data instance;
   generating a self-prediction vector using at least a portion of the trained supervised ML models and the query data instance, the self-prediction vector including values for the plurality of features that the query data instance should have if the query data instance is normal rather than anomalous; and
   generating an anomaly score for the query data instance based on the self-prediction vector and the query data instance.

9. The non-transitory computer readable storage medium of claim 8 wherein generating the self-prediction vector comprises, for each supervised ML model trained using a labeled training data set whose labels correspond to a feature k in the plurality of features:
  providing, to the supervised ML model, one or more values in the query data instance for one or more features in the plurality of features other than feature k; and
  generating, using the supervised ML model, a predicted value for feature k.

10. The non-transitory computer readable storage medium of claim 8 wherein generating the anomaly score comprises:
  computing a distance between the query data instance and the self-prediction vector.

11. The non-transitory computer readable storage medium of claim 10 wherein computing the distance comprises, for each feature in the plurality of features:
  if the feature is a numerical feature, computing an absolute difference between a first value for the feature in the query data instance and a second value for the feature in the self-prediction vector.

12. The non-transitory computer readable storage medium of claim 10 wherein computing the distance comprises, for each feature in the plurality of features:
  if the feature is a categorical feature, computing an absolute difference between a first class probability value generated with respect to a first value for the feature in the query data instance and a second class probability value generated with respect to a second value for the feature in the self-prediction vector.

13. The non-transitory computer readable storage medium of claim 8 wherein generating the anomaly score comprises:
  providing the query data instance and the self-prediction vector as input to an unsupervised anomaly detection classifier.

14. The non-transitory computer readable storage medium of claim 8 wherein prior to generating the self-prediction vector, the trained supervised ML models are filtered based on their predictive performance, and wherein the self-prediction vector is generated using a subset of the trained supervised ML models that are not filtered.

15. A computer system comprising:
  a processor; and
  a non-transitory computer readable medium having stored thereon program code that, when executed, causes the processor to:
    receive an unlabeled training data set comprising a plurality of unlabeled data instances, each unlabeled data instance including values for a plurality of features;
    for each feature in the plurality of features, train a supervised machine learning (ML) model using a labeled training data set derived from the unlabeled training data set, wherein the labeled training data set comprises a plurality of labeled data instances, and wherein each labeled data instance includes:
      a label corresponding to a value for the feature in an unlabeled data instance of the unlabeled training data set; and
      values for other features in the unlabeled data instance;
    receive a query data instance;
    generate a self-prediction vector using at least a portion of the trained supervised ML models and the query data instance, the self-prediction vector including values for the plurality of features that the query data instance should have if the query data instance is normal rather than anomalous; and
    generate an anomaly score for the query data instance based on the self-prediction vector and the query data instance.

16. The computer system of claim 15 wherein the program code that causes the processor to generate the self-prediction vector comprises program code that causes the processor to, for each supervised ML model trained using a labeled training data set whose labels correspond to a feature k in the plurality of features:
  provide, to the supervised ML model, one or more values in the query data instance for one or more features in the plurality of features other than feature k; and
  generate, using the supervised ML model, a predicted value for feature k.

17. The computer system of claim 15 wherein the program code that causes the processor to generate the anomaly score comprises program code that causes the processor to:
  compute a distance between the query data instance and the self-prediction vector.

18. The computer system of claim 17 wherein the program code that causes the processor to compute the distance comprises program code that causes the processor to, for each feature in the plurality of features:
  if the feature is a numerical feature, compute an absolute difference between a first value for the feature in the query data instance and a second value for the feature in the self-prediction vector.

19. The computer system of claim 18 wherein the program code that causes the processor to compute the distance comprises program code that causes the processor to, for each feature in the plurality of features:
  if the feature is a categorical feature, compute an absolute difference between a first class probability value generated with respect to a first value for the feature in the query data instance and a second class probability value generated with respect to a second value for the feature in the self-prediction vector.

20. The computer system of claim 15 wherein the program code that causes the processor to generate the anomaly score comprises program code that causes the processor to:
  provide the query data instance and the self-prediction vector as input to an unsupervised anomaly detection classifier.

21. The computer system of claim 15 wherein prior to generating the self-prediction vector, the trained supervised ML models are filtered based on their predictive performance, and wherein the self-prediction vector is generated using a subset of the trained supervised ML models that are not filtered.

* * * * *